(12) United States Patent
Ueno (10) Patent No.: US 6,836,586 B2
(45) Date of Patent: Dec. 28, 2004

(54) SMALL SIZED OPTICAL SWITCH

(75) Inventor: Nobuhiro Ueno, Oyama (JP)

(73) Assignee: Hitachi Metals, Ltd., Tokyo (JP)

( * ) Notice: Subject to any disclaimer, the term of this patent is extended or adjusted under 35 U.S.C. 154(b) by 423 days.

(21) Appl. No.: 09/993,649

(22) Filed: Nov. 27, 2001

(65) Prior Publication Data

US 2002/0141691 A1 Oct. 3, 2002

(30) Foreign Application Priority Data

Dec. 28, 2000 (JP) ..................................... 2000-400083

(51) Int. Cl.[7] .............................................. G02B 6/26
(52) U.S. Cl. .............................. 385/22; 385/16; 385/59
(58) Field of Search ............................. 385/22, 16, 17, 385/59, 19, 39, 40, 50, 52, 6, 9

(56) References Cited

U.S. PATENT DOCUMENTS

| | | | | |
|---|---|---|---|---|
| 5,031,994 A | * | 7/1991 | Emmons ...................... | 385/16 |
| 5,268,975 A | * | 12/1993 | Yoshitani et al. ............. | 385/22 |
| 5,483,608 A | * | 1/1996 | Yokomachi et al. .......... | 385/22 |
| 5,905,829 A | * | 5/1999 | Maenishi et al. ............. | 385/59 |
| 5,926,588 A | * | 7/1999 | Murakami et al. ............ | 385/16 |
| 6,094,293 A | * | 7/2000 | Yokoyama et al. ......... | 359/280 |
| 6,169,826 B1 | | 1/2001 | Nishiyama et al. | |
| 6,215,919 B1 | * | 4/2001 | Li et al. ....................... | 385/16 |

* cited by examiner

*Primary Examiner*—Frank G. Font
*Assistant Examiner*—K. Cyrus Kianni

(57) ABSTRACT

To provide a mechanical optical switch including a movable optical fiber which can be elastically deformed and a fixed optical fiber, open ends of the movable optical fiber and the fixed optical fiber facing each other via an optical gap, which switches an optical path by moving the open end of the movable optical fiber relatively to the open end of the fixed optical fiber with an electromagnetic actuator. The fixed optical fiber is held by a fixed holder at a point close to its open end. The movable optical fiber is supported by another fixed holder at a point distant from its open end, and a movable holder holding the movable optical fiber at a point close to its open end reciprocates relatively to the fixed holder holding the fixed optical fiber. An electromagnetic actuator is located in an area on the movable optical fiber side from the open end of the movable optical fiber. Preferably, it is provided between the open end of the movable optical fiber and the latter fixed holder. Thus, downsizing of the optical switch can be realized.

10 Claims, 7 Drawing Sheets

PRIOR ART

FIG. 7

SMALL SIZED OPTICAL SWITCH

BACKGROUND OF THE INVENTION

1. Field of the Invention

The present invention relates to an optical switch, and in particular, to an optical switch suitably used in an optical communication apparatus, an optical transmission apparatus, and the like.

2. Description of the Related Art

As for an optical switch for switching an optical path, those for switching a traveling direction of light by electrically changing a refractive index or phase of an optical path, switching a traveling direction of light by mechanically displacing an optical path, and so on have been developed. The mechanical optical switch has been often used in an optical communication apparatus, optical transmission apparatus, or the like because it has a low coupling loss of light, is substantially independent of the wavelength of the propagating light, and have a self-latching property for maintaining, even after removal of electric power, the coupling state of light in a state before the removal.

The mechanical optical switch comprises a movable optical fiber which can be elastically deformed and two fixed optical fibers, an open end of the movable optical fiber facing to open ends of the fixed optical fibers via an optical gap, and switches the optical path by displacing the open end of the movable optical fiber with respect to the open ends of the fixed optical fibers. A silicone based liquid serving as an index matching oil is placed between the open end of the movable optical fiber and those of the fixed optical fibers in order to prevent attenuation and scattering of light from occurring there. For that purpose, the whole mechanism of the optical switch is contained in a housing, and the housing is filled with the silicone based liquid.

The fixed optical fibers are held by a fixed holder (fixed block) at portions close to their open ends. The movable optical fiber is held by a movable holder (movable block) at a portion close to its open end. The movable optical fiber is held by another fixed holder at a point distant from the tip of the movable optical fiber, and the point constitutes a fulcrum.

Since the open ends of the fixed optical fibers and the open end of the movable optical fiber are provided to face to each other, the fixed holder and the movable holder also face to each other. In order to displace the open end of the movable optical fiber with respect to the open ends of the fixed optical fibers, the movable holder is displaced with respect to the fixed holder. In order to keep such a movement within a certain route for avoiding misalignment when displacing the movable holder with respect to the fixed holder, guide pins are provided on one of the holders (for example, fixed holder) to protrude from the facing surface thereof and are inserted into guide channels provided on the facing surface of the other holder (for example, movable holder). Thus, when the movable holder is displaced, the guide pins move along the guide channels, and the movable holder is stopped when the guide pins reach the ends of the guide channels.

An electromagnetic actuator is used to displace the movable holder or movable optical fiber with respect to the end of the fixed optical fiber, which is typically large in size. The movable holder or movable optical fiber is moved in the index matching oil having viscosity, so that a significant magnitude of force is required. For that purpose, a large electromagnetic actuator is required. The housing of the optical switch is intended to contain the large electromagnetic actuator therein, so that it also becomes large in size. In addition, since the optical switch circuit includes a combination of many optical switches, if the individual optical switches are large, the optical switch circuit is also large.

U.S. Pat. No. 6,169,826 (issued on Jan. 2, 2001) has been proposed to reduce the size of an electromagnetic actuator used in an optical switch. The structure thereof will be described below with reference to FIG. 6.

Figure 6:
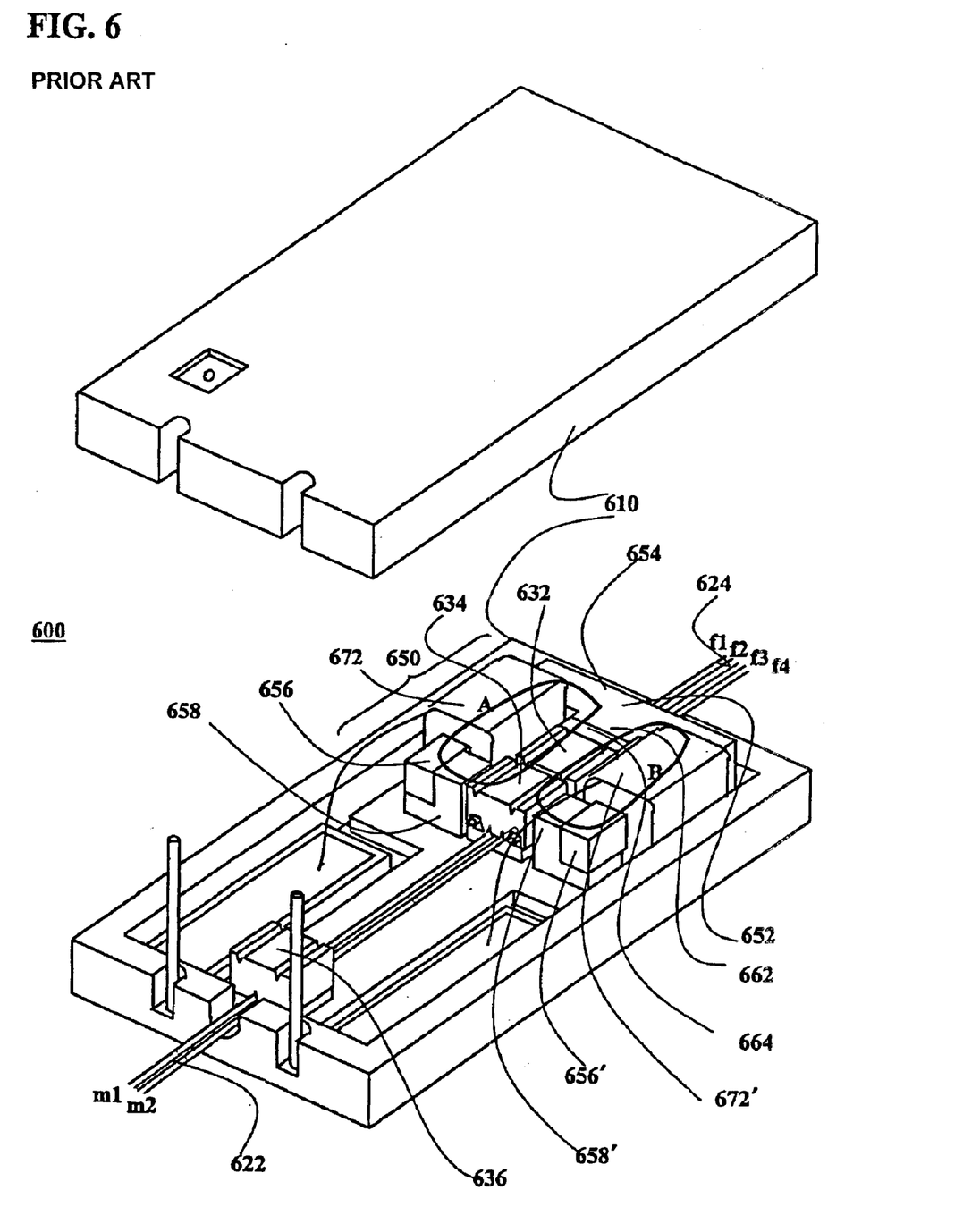
FIG. 6 is an exploded perspective view of an optical switch according to a patent.

Referring to FIG. 6, in an optical switch 600, fixed optical fibers 624 and movable optical fibers 622 are positioned so as to have their respective open ends faced to each other in a housing 610. The open ends of the movable optical fibers are moved relatively to the open ends of the fixed optical fibers to connect and/or disconnect an optical path. The fixed optical fibers are held by a fixed holder 632 made of soft magnetic ceramic at a portion close to the open ends thereof in the housing 610. The movable optical fibers 622 are supported and fixed in the housing 610 by another fixed holder 636 at a distance from the open ends thereof and are held by a movable holder 634 made of soft magnetic ceramic at a portion close to the open ends thereof. When the movable holder 634 made of soft magnetic ceramic is reciprocated with respect to the fixed holder 632 made of soft magnetic ceramic, the open ends of the movable optical fibers held by the movable holder 634 made of soft magnetic ceramic are reciprocated with respect to the tips of the fixed optical fibers 624 along with the movable holder 634 to connect and/or disconnect the optical path.

An electromagnetic actuator 650 comprises an E-shaped yoke 652 having a back yoke (column yoke) 654 which is located on the side of the fixed optical fibers 624 from the fixed holder 632 made of soft magnetic ceramic in the housing, and first and second end legs 656 and 656' of the E-shaped yoke 652 extend from the back yoke 654 to the side surfaces of the movable holder 634 made of soft magnetic ceramic. The first and second end legs 656 and 656' have first and second pole pieces 658 and 658', respectively, which face the side surfaces of the movable holder 634 made of soft magnetic ceramic. The movable holder 634 made of soft magnetic ceramic can reciprocate between the first and second pole pieces 658 and 658'. A center leg 662 protruding from the center of the back yoke 654 toward the movable holder 634 made of soft magnetic ceramic is constituted by a permanent magnet 664 and the fixed holder 632 made of soft magnetic ceramic. For example, the permanent magnet 664 may be a sintered neodymium-iron-boron permanent magnet.

The permanent magnet 664 is magnetized in a direction from the fixed holder 632 made of soft magnetic ceramic to the back yoke 654 or in the direction opposite thereto. Part of the magnetic flux exiting from the permanent magnet 664 enters the first end leg 656 through the back yoke 654. Then, it enters the movable holder 634 made of soft magnetic ceramic via the first pole piece 658. Then, it passes through the fixed holder 632 made of soft magnetic ceramic to return to the permanent magnet 664. In this way, the permanent magnet 664, a first half of the back yoke 654, the first end leg 656, the first pole piece 658, the movable holder 634, and the fixed holder 632 constitute a first magnetic path. The magnetic flux of the permanent magnet passing through the first magnetic path is denoted by reference symbol A in this drawing.

Part of the magnetic flux exiting from the permanent magnet 664 enters the second end leg 656' through the back yoke 654. Then, it enters the movable holder 634 made of soft magnetic ceramic via the second pole piece 658'. Then, it passes through the fixed holder 632 made of soft magnetic ceramic to return to the permanent magnet 664. In this way, the permanent magnet 664, a second half of the back yoke 654, the second end leg 656', the second pole piece 658', the movable holder 634, and the fixed holder 632 constitute a second magnetic path. The magnetic flux of the permanent magnet passing through the second magnetic path is denoted by reference symbol B in this drawing.

FIG. 6 shows a state in which the movable holder 634 made of soft magnetic ceramic is attracted by the first pole piece 658, and there is a wider gap between the movable holder and the second pole piece 658'. The optical switch 600 comprises four fixed optical fibers 624 (denoted by reference symbols f1, f2, f3, and f4 from the left) and two movable optical fibers 622 (denoted by reference symbols m1 and n2 from the left). When the movable holder 634 made of soft magnetic ceramic is attracted by the first pole piece 658, the fixed optical fiber f1 and the movable optical fiber m1 have their open ends face each other, and the fixed optical fiber f3 and the movable optical fiber m2 have their open ends face each other, thereby establishing optical paths between them respectively. On the other hand, when the movable holder 634 made of soft magnetic ceramic is attracted by the second pole piece 658', optical paths are established between the fixed optical fiber f2 and the movable optical fiber m1, and between the fixed optical fiber f4 and the movable optical fiber m2. Displacing the movable holder 634 from the first pole pieces 658 to the second pole piece 658' can switch the position of the movable optical fiber m1 from the fixed optical fiber f1 to f2, and the position of the movable optical fiber m2 from the fixed optical fiber f3 to f4.

First and second coil members 672 and 672' are wound around the first and second end legs 656 and 656', respectively. When a current for canceling or decreasing the magnetic flux A is applied to the first coil member 672, and a current having a direction intended to increase the magnetic flux B is applied to the second coil member 672', the attraction between the movable holder 634 and the first pole piece 658 is vanished, and then the movable holder 634 is attracted to the second pole piece 658' to move toward the second pole piece 658'. When the movable holder 634 is attracted by the second pole piece 658', the optical paths are established in such a manner that the movable optical fiber m1 is connected to the fixed optical fiber f2 and the movable optical fiber m2 is connected to the fixed optical fiber f4. If the current applied to the first and second coil members 672 and 672' is stopped in this state, the state in which the movable holder 634 is attracted by the second pole piece 658' is maintained by the permanent magnet 664.

If a current for canceling or decreasing the magnetic flux B is applied to the second coil member 672', and a current for increasing the magnetic flux A is applied to the first coil member 672 when the movable holder 634 is attracted by the second pole piece 658', the movable holder 634 leaves the second pole piece 658' and moves toward the first pole piece 658. Then, as shown in FIG. 6, the movable optical fiber m1 is connected to the fixed optical fiber f1, and the movable optical fiber m2 is connected to the fixed optical fiber f3. If the current applied to the coil members 672 and 672' is stopped in this state, the connections are maintained.

In case of the electromagnetic actuator according to the above-described U.S. Patent, downsizing is realized by utilizing the movable holder 634 and fixed holder 632 both made of soft magnetic ceramic as part of the magnetic circuit of the electromagnetic actuator 650.

Since the fixed holder 632 is utilized as part of the magnetic circuit, however, most parts of the electromagnetic actuator 650 are provided on the side of the fixed optical fiber 624 in the optical switch 600. The length of the movable optical fiber 622 from its fulcrum to its open end is required to be enough for allowing a portion thereof from the fulcrum to the open end, in particular, to the point supported by the movable holder, to elastically pivot without undergoing an excessive force. For this reason, this portion of the movable optical fiber cannot be shortened.

Therefore, the optical fiber has a length more than the sum of the length from the fulcrum to the open end of the movable optical fiber and the length of the electromagnetic actuator. The electromagnetic actuator includes the coil members. If the length of the electromagnetic actuator is reduced, the length of the coil member should also be reduced. Therefore, in order to ensure the same level of ampere-turn, the coil is rolled up to increase the number of overlap accordingly. As a result, the coil has an increased diameter, and it becomes required to increase the size of the housing of the optical switch for containing the electromagnetic actuator.

SUMMARY OF THE INVENTION

Therefore, an object of the invention is to provide an optical switch further reduced in size compared with the optical switch proposed in the U.S. Pat. No. 6,169,826.

An optical switch for connecting and/or disconnecting an optical path according to the present invention comprises:

a housing;

at least one fixed optical fiber having an open end in the housing; at least one movable optical fiber having an open end capable of moving relatively to the open end of the fixed optical fiber, the open end of the movable optical fiber being located in the housing;

a fulcrum fixing the movable optical fiber at a distance from the open end of the movable optical fiber; and a movable holder of magnetic material fixing the movable optical fiber near the open end of the movable optical fiber and allowing the movable optical fiber to elastically pivot on the fulcrum to move the open end of the movable optical fiber relatively to the open end of the fixed optical fiber, in which an electromagnetic actuator reciprocating the movable holder is located in an area on the movable optical fiber side from the open end of the movable optical fiber in the housing.

The electromagnetic actuator preferably comprises:

a first yoke having a first pole piece;

a second yoke having a second pole piece, the movable holder being placed between the first and second pole pieces so as to reciprocate between the two pole pieces;

a permanent magnet exerting a magnetic flux on the first and second yokes and the movable holder, the permanent magnet constituting a first magnetic path along with the first yoke and the movable holder and constituting a second magnetic path along with the second yoke and the movable holder;

a first coil member wound around the first yoke to adjust the magnetic flux between the movable holder and the first pole piece; and a second coil member wound around the second yoke to adjust the magnetic flux between the movable holder and the second pole piece.

The electromagnetic actuator preferably comprises an E-shaped yoke having two end legs and a center leg, the end legs constituting the first and second yokes, respectively, and the center leg having the permanent magnet. The E-shaped yoke may have a back yoke connecting the center leg to both the end legs. The back yoke may include the fulcrum on which the movable optical fiber elastically pivots.

Alternatively, in the above-described optical switch, the electromagnetic actuator may further comprise a back yoke magnetically connecting the permanent magnet to both the first and second yokes. The back yoke may include the fulcrum on which the movable optical fiber elastically pivots.

The first and second coil member may extend from the vicinities of the first and second pole pieces, respectively, to the vicinity of the back yoke.

Furthermore, the permanent magnet may be located at the end of the center leg of the E-shaped yoke to face the movable holder.

An optical switch according to the present invention comprises:

a housing having at least two end walls facing each other;

at least one fixed optical fiber having an open end near one of the end walls in the housing;

at least one movable optical fiber having an open end capable of moving relatively to the open end of the fixed optical fiber, the open end of the movable optical fiber being located in the housing;

a fulcrum fixing the movable optical fiber at a distance from the open end of the movable optical fiber and located near the other end wall in the housing;

a movable holder of magnetic material fixing the movable optical fiber near the open end of the movable optical fiber and allowing the movable optical fiber to elastically pivot on the fulcrum to move the open end of the movable optical fiber relatively to the open end of the fixed optical fiber; and an electromagnetic actuator reciprocating the movable holder, the electromagnetic actuator being located in an area on the movable optical fiber side from the open end of the movable optical fiber in the housing.

DETAILED DESCRIPTION OF THE PREFERRED EMBODIMENTS

Figure 2:
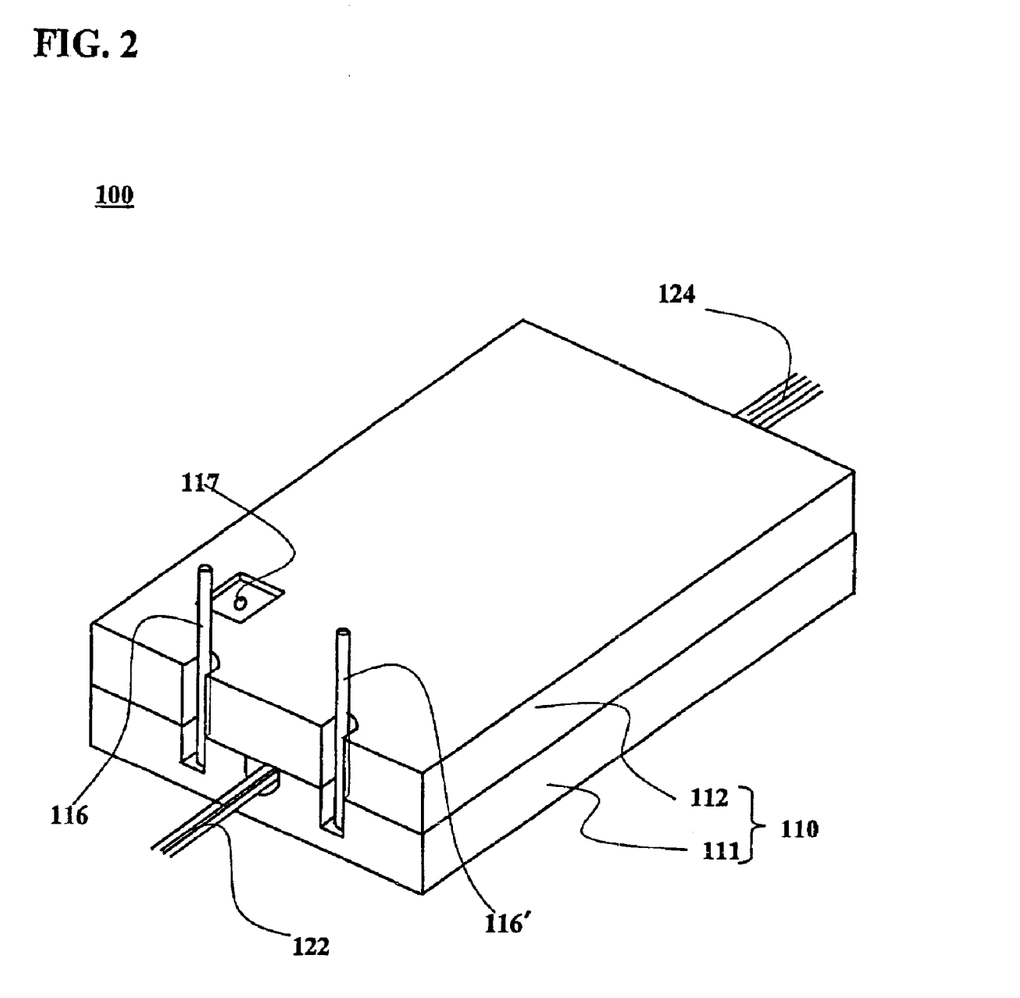
FIG. 2 is a perspective view of an optical switch with a housing being assembled according to an embodiment of the present invention.
Figure 3:
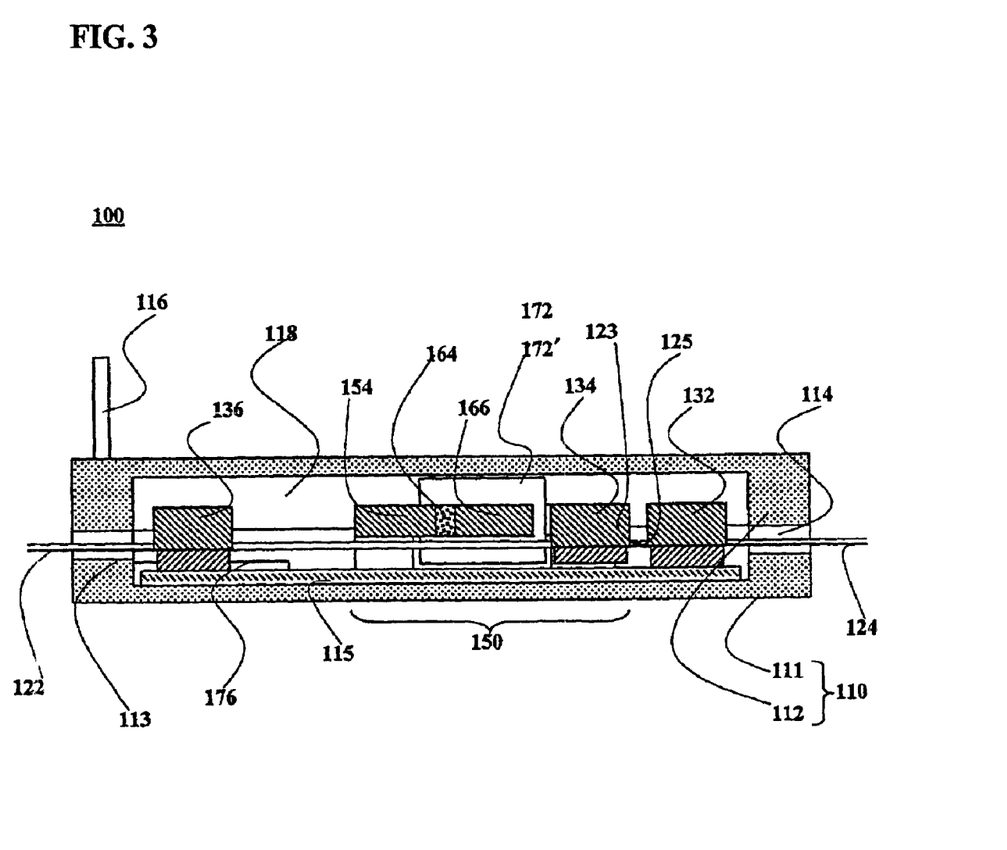
FIG. 3 is a longitudinal sectional view of an optical switch according to an embodiment of the present invention.

An embodiment of an optical switch according to the present invention will be described in detail below with reference to FIGS. 1 through 3. An optical switch 100 has a housing 110, in which an open end 125 of a fixed optical fiber and an open end 123 of a movable optical fiber are arranged to face each other. The open end 123 of the movable optical fiber can be moved relatively to the open end 125 of the fixed optical fiber. The housing 110 is provided by combining a box-shaped lower half 111 and a box-shaped upper half 112 and accommodates the optical switch mechanism. The fixed optical fiber 124 is introduced into the housing 110 via a slot 114 provided in a housing wall on the side of the fixed optical fiber. Four fixed optical fibers 124 are arranged side-by-side as in FIG. 6. The movable optical fiber 122 is introduced into the housing 110 via a slot 113 provided in a housing wall on the side of the movable optical fiber. Two movable optical fibers 122 are arranged side-by-side as in the case shown in FIG. 6. After the optical switch mechanism is mounted on a substrate 115 (for example, glass plate) placed on a bottom surface of the lower half 111 of the housing, and the upper half 112 of the housing is put thereon, the lower half 111 and the upper half 112 of the housing are fixed by an adhesive, and an adhesive is applied to the slots 113 and 114 passing the optical fibers therethrough, thereby sealing the housing. FIG. 2 is a perspective view illustrating an appearance of the upper half 112 of the housing and the lower half 111 having the optical switch mechanism mounted therein which are assembled and fixed by an adhesive. FIG. 3 is a longitudinal sectional view taken along the centerline of the housing. An index matching oil 118 (shown in FIG. 3) is injected into the housing through the injection hole 117 provided in the upper portion of the housing 110 to immerse the whole mechanism of the optical switch in the index matching oil 118, thereby placing the index matching oil 118 between the open end 123 of the movable optical fiber and the open end 125 of the fixed optical fiber.

The fixed optical fiber 124 is fixed, near the open end 125 thereof, by a fixed holder 132 attached to the substrate 115. The movable optical fiber 122 is fixed, at a distance from the open end 123 thereof, to the substrate 115 by another fixed holder 136 attached to the substrate 115. The latter fixed holder 136 is arranged near the housing wall having the slot 113 passing the movable optical fiber 122 therethrough. The fixed holder 132 holding the fixed optical fiber 124 is arranged near the housing wall having the slot 114 passing the fixed optical fiber 124 therethrough. A movable holder 134 made of soft magnetic material is provided on the substrate 115 so as to face the fixed holder 132, holds the movable optical fiber 122 near the open end 123 thereof, and reciprocates relatively to the fixed holder 132 on the substrate 115, thereby connecting and/or disconnecting, or switching, the open end 125 of the fixed optical fiber and the open end 123 of the movable optical fiber. Providing a gap between the movable holder 134 of soft magnetic material and the substrate 115, such as a glass plate, allows the movable holder 134 to move smoothly.

Figure 1:
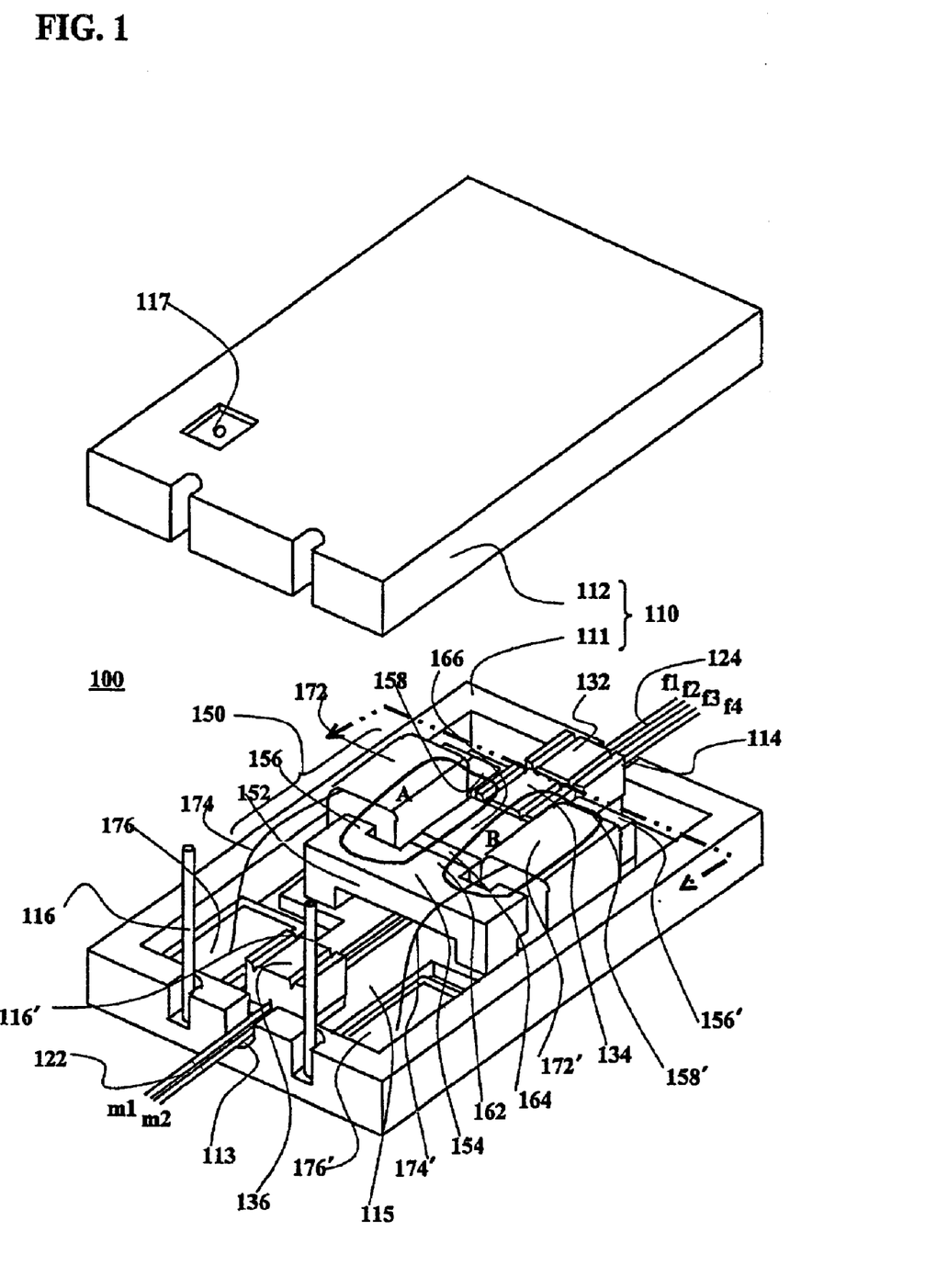
FIG. 1 is an exploded perspective view of an optical switch according to an embodiment of the present invention.

In FIG. 1, as in the case shown in FIG. 6, there is four fixed optical fibers 124 (f1, f2, f3, and f4 from the left) and two movable optical fibers 122 (m1 and m2 from the left). When the movable holder 134 is located at the left in FIG. 1, the movable optical fiber m1 and the fixed optical fiber f1 have their open ends face each other, and the movable optical fiber m2 and the fixed optical fiber f3 have their open ends face each other, thereby establishing optical paths between them respectively. When the movable holder 134 is shifted to the right in FIG. 1, the movable optical fiber m1 and the fixed optical fiber f2, and the movable optical fiber m2 and the fixed optical fiber f4 establish their respective optical paths between them.

In order to reciprocate the movable holder 134 made of soft magnetic material relatively to the fixed holder 132, an electromagnetic actuator 150 is located in an area on the side of the movable optical fiber 122 from the open end 123 of the movable optical fiber in the housing 110. That is, the electromagnetic actuator 150 is provided between the front end of the movable holder 134 near the fixed holder 132 and the rear end of the fixed holder 136 (that is, the end of the fixed holder 136 near the housing wall on the side of the movable optical fiber).

As shown in FIG. 1, the electromagnetic actuator 150 has an E-shaped yoke 152, which has two end legs 156, 156' and a center leg 162. The E-shaped yoke 152 has a back yoke 154, and the end leg 156 extends from one end of the back yoke 154 to a position where it faces one side surface of the movable holder 134 of soft magnetic material. The end leg 156' extends from the other end of the back yoke 154 to a position where it faces the other side surface of the movable holder 134 of soft magnetic material. The end legs 156 and 156' have pole pieces 158 and 158', respectively, each of which faces a side surface of the movable holder 134.

The end leg 156 and the half of the back yoke 154 on the side of the end leg 156 may be collectively referred to as a first yoke. The end leg 156' and the half of the back yoke 154 on the side of the end leg 156' may be collectively referred to as a second yoke. The pole piece 158 attached to the end leg 156 may be referred to as a first pole piece, the pole piece 158' attached to the end leg 156' may be referred to as a second pole piece.

The movable holder 134 has gaps between the first pole piece 158 and one side surface of the movable holder 134 and between the second pole piece 158' and the other side surface of the movable holder 134, respectively, so as to reciprocate between the first and second pole pieces 158 and 158'.

A permanent magnet 164 and a soft magnetic material block 166 are provided on the center leg 162 attached to the back yoke 154 of the E-shaped yoke 152, and the center leg 162 extends toward the movable holder 134. The permanent magnet 164 is magnetized in a direction from the soft magnetic material block 166 to the back yoke 154, or in the direction opposite thereto. The permanent magnet 164 may be a sintered neodymium-iron-boron permanent magnet. Part of the magnetic flux exiting from the permanent magnet 164 enters the end leg 156 through the back yoke 154. Then, it enters the movable holder 134 made of soft magnetic material via the first pole piece 158. Then, it passes through the soft magnetic material block 166 to return to the permanent magnet 164. In this way, the permanent magnet 164, the first half of the back yoke 154, the end leg 156, the first pole piece 158, the movable holder 134, and the soft magnetic material block 166 constitute a first magnetic path. The magnetic flux of the permanent magnet passing through the first magnetic path is denoted by reference symbol A in the drawing.

Part of the magnetic flux exiting from the permanent magnet 164 enters the end leg 156' through the back yoke 154. Then, it enters the movable holder 134 made of soft magnetic material via the second pole piece 158'. Then, it passes through the soft magnetic material block 166 to return to the permanent magnet 164. In this way, the permanent magnet 164, the second half of the back yoke 154, the end leg 156', the second pole piece 158', the movable holder 134, and the soft magnetic material block 166 constitute a second magnetic path. The magnetic flux passing through the second magnetic path is denoted by reference symbol B in the drawing.

A first coil member 172 and a second coil member 172' are wound around the end legs 156 and 156', respectively. In order to apply a current to the first and second coil members 172 and 172', leads 174 and 174' extending from two terminals 176 and 176' provided in the housing are connected to the coil members 172 and 172', respectively, and the two terminals 176 and 176' are connected to an external power supply (not shown) via external leads 116 and 116', respectively. The first and second coil members 172 and 172' are connected in series in such a manner that when a DC voltage is applied between their respective terminals 176 and 176', the two coil members 172 and 172' generate magnetic fields of directions opposite to each other. When a current for canceling or decreasing the magnetic flux A is applied to the first coil member 172, and a current having a direction intended to increase the magnetic flux B is applied to the second coil member 172', the attraction between the movable holder 134 and the first pole piece 158 is vanished, and then the movable holder 134 is attracted to the second pole piece 158' to move toward the second pole piece 158'. In the state in which the movable holder 134 is attracted by the second pole piece 158', the optical paths are established in such a manner that the movable optical fiber m1 is connected to the fixed optical fiber f2 and the movable optical fiber m2 is connected to the fixed optical fiber f4. If the current applied to the first and second coil members 172 and 172' is stopped in this state, the state in which the movable holder 134 is attracted by the second pole piece 158' is maintained by the permanent magnet 164.

If a current for canceling or decreasing the magnetic flux B is applied to the second coil member 172', and a current for increasing the magnetic flux A is applied to the first coil member 172 when the movable holder 134 is attracted by the second pole piece 158', the movable holder 134 leaves the second pole piece 158' and moves toward the first pole piece 158. Then, the movable optical fiber m1 is connected to the fixed optical fiber f1, and the movable optical fiber m2 is connected to the fixed optical fiber f3. If the current applied to the coil members is stopped in this state, the connections are maintained.

As apparent from the above description and comparison between FIGS. 1 and 6, in the optical switch 100 of the present invention, the electromagnetic actuator 150 is located in an area on the side of the movable optical fiber 122 from the open end 123 of the movable optical fiber in the housing 110. On the contrary, in the optical switch 600 shown in FIG. 6, the electromagnetic actuator 650 is located in an area on the side of the fixed optical fiber 624 from the movable holder 634 supporting the movable optical fiber 622.

In addition, the length of the movable optical fiber from its fulcrum to the movable holder is required to be enough for allowing a portion of the movable optical fiber from the fulcrum to its open end, in particular, to the point supported by the movable holder, to elastically pivot without undergoing an excessive force. In the case where an optical fiber having a diameter of 0.125 mm is used, the required length thereof is typically 10 mm.

In the optical switch 100 of the present invention, the electromagnetic actuator 150 can be accommodated in the length required for the optical fiber to elastically pivot, that is, the length between the fulcrum and the movable holder, and therefore, there is no need to increase the length of the optical switch to accommodate the electromagnetic actuator. By contrast, in the conventional optical switch shown in FIG. 6, in addition to the length from the fulcrum of the movable optical fiber to the movable holder, a length intended to accommodate the electromagnetic actuator is required in the housing 610 of the optical switch. In the conventional optical switch 600 shown in FIG. 6, the electromagnetic actuator 650 is shortened to reduce the length of the optical switch. Thus, the length of the coil is about 5 mm, for example. When attaining the power of the electromagnetic actuator of 80 mN, each of the coil members requires 400 turns of a wire having a diameter of 0.09 mm in order to attain 24 AT. Therefore, provided that the length of the coil is 5 mm, the coil requires the outer diameter of 4 mm. On the other hand, the optical switch of the present invention is configured to accommodate the electromagnetic actuator in the space between the fulcrum and the movable holder, and therefore, as shown in the longitudinal sectional view of FIG. 3, the length of the electromagnetic actuator 150 can be increased, and the length of the coil member 172 and 172' can also be increased. Thus, even if the number of turns of the coil is the same as in the case of the conventional optical switch, the outer diameter of the coil can be reduced. As a result, the height of the optical switch can also be reduced. Such an example will be described below with reference to FIG. 4 illustrating another embodiment in the form of a longitudinal sectional view.

Figure 4:
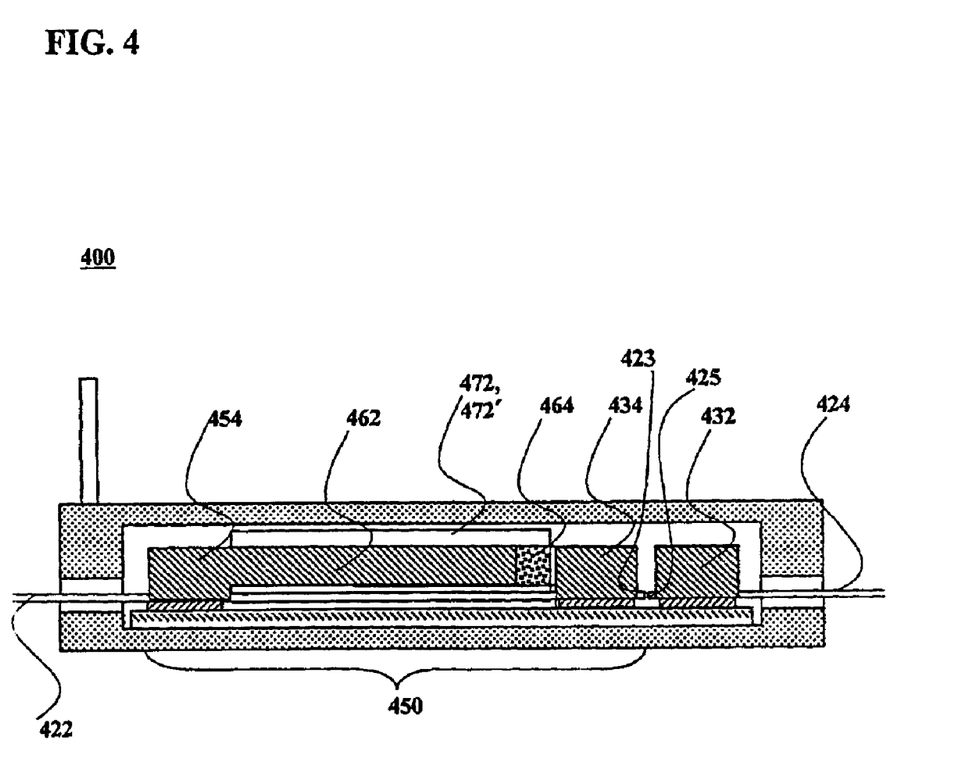
FIG. 4 is a longitudinal sectional view of an optical switch according to another embodiment of the present invention.

As for an optical switch 400 according to another embodiment of the present invention shown in FIG. 4, while an electromagnetic actuator 450 has the same structure as that shown in FIGS. 1 and 3, a back yoke 454 of an E-shaped yoke is provided at a position where the fixed holder 136 is to be provided in the previous embodiment, and the back yoke 454 also serves as the fixed holder 136 to support a movable optical fiber 422 at the position. In the drawing, reference numeral 434 denotes a movable holder, which holds the movable optical fiber 422 at a point near an open end 423 thereof and allows the open end 423 of the movable optical fiber to elastically pivot on a fulcrum provided by the back yoke 454. The electromagnetic actuator 450 of the optical switch 400 has end legs extending from two ends of the E-shaped yoke to the vicinities of side surfaces of the movable holder, but they are not shown in the drawing because it is a longitudinal sectional view taken along the centerline of the optical switch. Only coil members 472 and 472' wound around the end legs are shown in the drawing. A center leg 462 extends from the back yoke 454 of the E-shaped yoke toward the movable holder 434, a gap is provided between the tip of the center leg and the movable holder 434 for allowing the movable holder 434 to reciprocate relatively to the fixed center leg. Most part of the center leg 462 is made of soft magnetic material, and a permanent magnet 464 (for example, a sintered neodymium-iron-boron permanent magnet) is attached to the tip end of the center leg 462 facing the movable holder. The permanent magnet 464 is magnetized in a direction from the portion 462 of the center leg made of soft magnetic material to the movable holder 434, or in the direction opposite thereto. Reference numeral 432 denotes a fixed holder, which holds a fixed optical fiber 424.

In case of the optical switch 400 of this embodiment, since the lengths of the coil member 472 and 472' may be the same as that from the movable holder 434 to the fulcrum of the movable optical fiber 422 (10 mm, for example) as shown in FIG. 4, dimensions of the optical switch required to attain the same behavior and performance as those of the optical switch 100 shown in FIGS. 1 through 3 are as shown in the following TABLE 1. In TABLE 1, the dimensional requirements of the conventional optical switch are also shown for comparison. As apparently seen from TABLE 1, the optical switch of the present invention can be significantly reduced in size compared with the conventional one.

TABLE 1

|  | THIS INVENTION | CONVENTIONAL EXAMPLE |
|---|---|---|
| LENGTH OF MOVABLE OPTICAL FIBER | 10 mm | 10 mm |
| LENGTH OF COIL | 10 mm | 5 mm |
| DIAMETER OF COIL | 3 mm | 4 mm |
| LENGTH OF OPTICAL SWITCH | 25 mm | 28 mm |
| THICKNESS OF OPTICAL SWITCH | 7.3 mm | 8.3 mm |

Furthermore, by providing the permanent magnet on the tip end of the center leg as in this embodiment, the need to provide the soft magnetic material block as shown in FIGS. 1 and 3 on the tip end of the center leg of the E-shaped yoke is eliminated, and therefore, the number of parts can be reduced.

Figure 5:
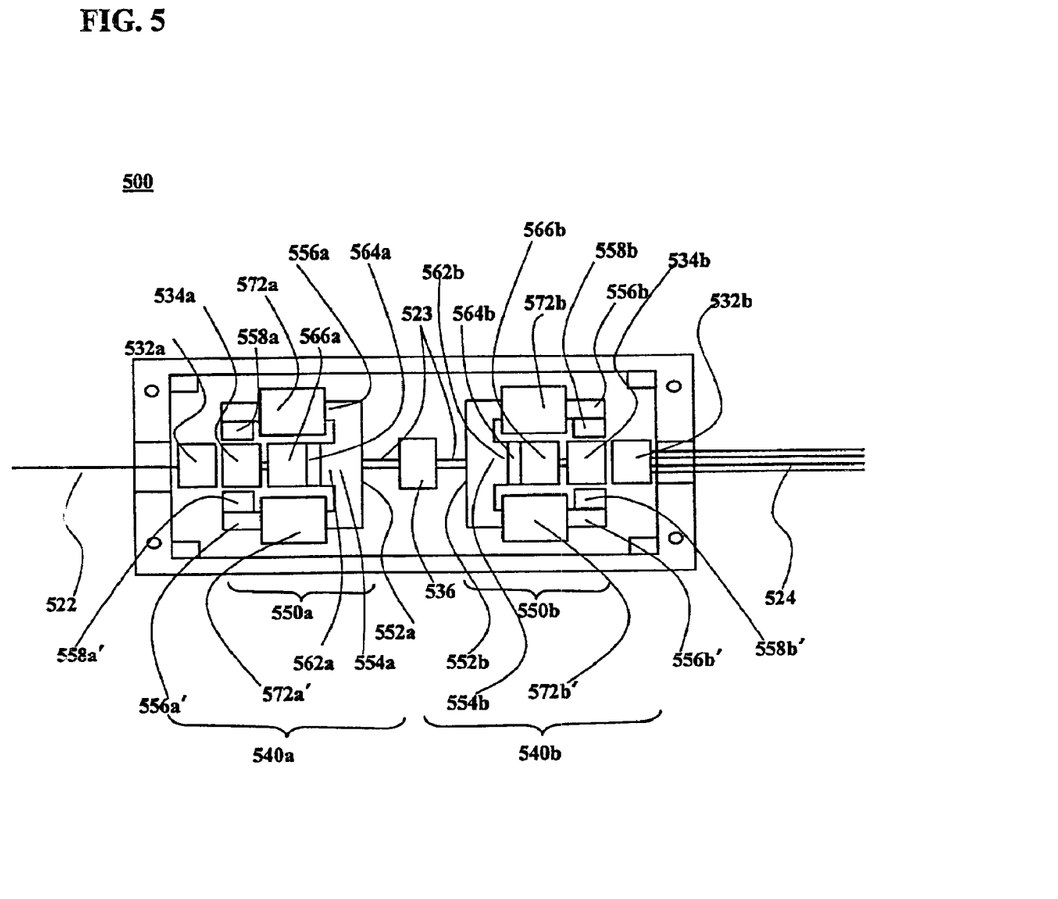
FIG. 5 is a plan view of an optical switch according to further embodiment of the present invention.
Figure 7:
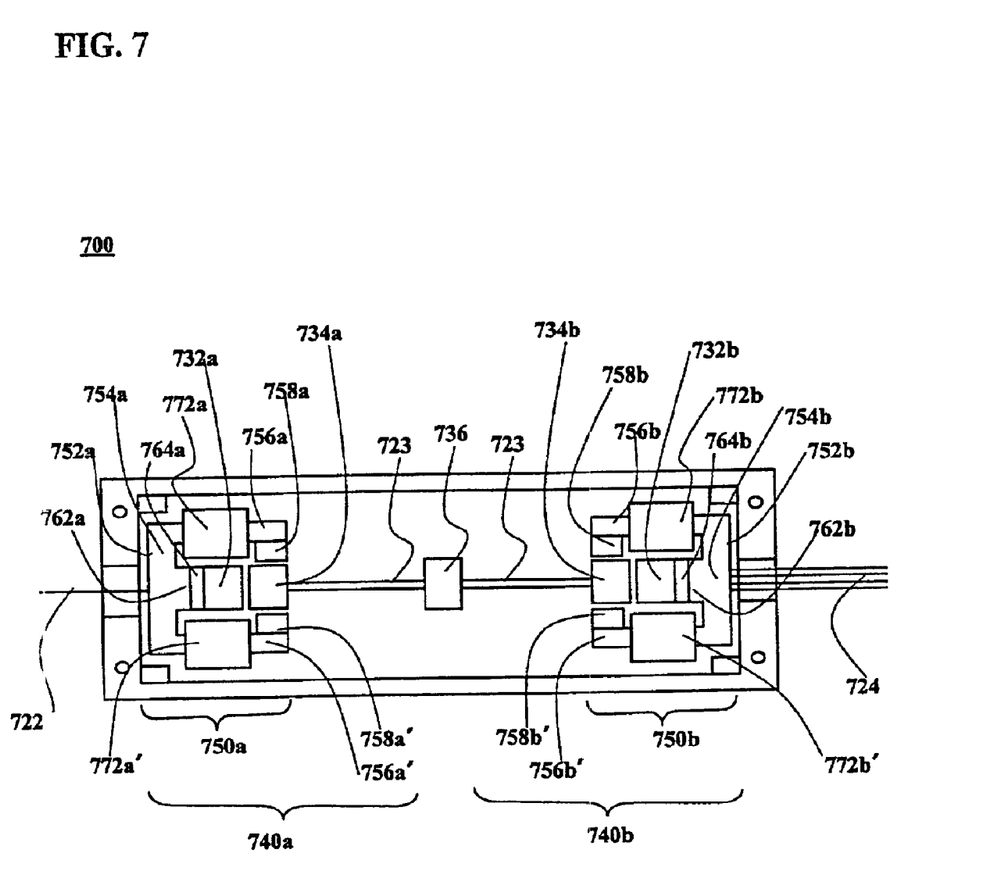
FIG. 7 is a plan view of an optical switch according to an comparative example.

An optical switch according to further embodiment of the present invention is shown in FIG. 5, and an optical switch of the same type to which the same concept as in FIG. 6 is applied is shown in the plan view of FIG. 7 for comparison. Both of the optical switches 500 and 700 shown in FIGS. 5 and 7 are 1×4 type optical switches. That is, there is provided one input optical fiber 522 (722) and four output optical fibers 524 (724), and first and second optical switch mechanisms 540*a* and 540*b* (740*a* and 740*b*). An optical path from the input fixed optical fiber 522 (722) can be switched by the first optical switch mechanism 540*a* (740*a*) between two movable optical fibers 523 (723). The optical paths from the two movable optical fiber 523 (723) can be switched by the second optical switch mechanism 540*b* (740*b*) between four output fixed optical fibers 524 (724). The intermediate movable optical fibers 523 (723) are supported at their center by a fixed holder, that is, a fixed block 536 (736), which constituting a fulcrum. The intermediate movable optical fiber 523 (723) is held by a first movable holder 534*a* (734*a*) included in the first optical switch mechanism 540*a* (740*a*) at a point near a first open end of the movable optical fiber 523 (723). When the first movable holder 534*a* (734*a*) reciprocates relatively to a first fixed holder 532*a* (732*a*) fixing the input fixed optical fiber 522 (722), the movable optical fiber 523 (723) elastically pivots on the fulcrum provided by the central fixed holder 536 (736). In this way, the optical path from the one input fixed optical fiber 522 (722) can be switched between the two intermediate movable optical fibers 523 (723).

Furthermore, the intermediate movable optical fiber 523 (723) is held by a second movable holder 534*b* (734*b*) included in the second optical switch mechanism 540*b* (740*b*) at a point near a second open end of the movable optical fiber 523 (723). When the second movable holder 534*b* (734*b*) reciprocates relatively to a second fixed holder 532*b* (732*b*) fixing the output fixed optical fiber 524 (724), the intermediate movable optical fiber 523 (723) elastically pivots on the fulcrum provided by the central fixed holder 536 (736). In this way, the optical paths from the two intermediate movable optical fibers 523 (723) can be switched between the four output fixed optical fibers 524 (724).

In the optical switch 700 of a comparative example shown in FIG. 7, a first electromagnetic actuator 750*a* for reciprocating the first movable holder 734*a* is located at the left side in the drawing, that is, toward the input fixed optical fiber 722 from the first movable holder 734a, and a second electromagnetic actuator 750b for reciprocating the second movable holder 734b is located at the right side in the drawing, that is, toward the output fixed optical fiber 724 from the second movable holder 734b. The electromagnetic actuator 750a (750b) included in the optical switch mechanism 740a (740b) has an E-shaped yoke 752a (752b). End legs 756a and 756a' (756b and 756b') provided on either ends of the back yoke 754a (754b) of the E-shaped yoke 752a (752b) extend from the back yoke 754a (754b) to the vicinities of side surfaces of the movable holder 734a (734b). A center leg 762a (762b) extending from the center of the back yoke 754a (754b) toward the movable holder 734a (734b) is provided with a permanent magnet 764a (764b) and a fixed holder 732a (732b) made of soft magnetic material. The end legs 756a and 756a' (756b and 756b') are provided with pole pieces 758a and 758a' (758b and 758b'), respectively, the pole pieces 758a and 758a' (758b and 758b') face the respective side surfaces of the movable holder 734a (734b), and the movable holder can reciprocate between the pole pieces. Coil members 772a and 772a' (772b and 772b') are wound around the end legs 756a and 756a' (756b and 756b'), respectively. As described so far, the optical switch shown in FIG. 7 has substantially the same structure as that of the optical switch shown in FIG. 6, with the exception that two electromagnetic actuators shown in FIG. 6 are used.

In the optical switch 500 according to further embodiment of the present invention shown in FIG. 5, a first electromagnetic actuator 550a for reciprocating the first movable holder 534a is located at the right side in the drawing, that is, toward the movable optical fiber 523 from the first movable holder 534a, and a second electromagnetic actuator 550b for reciprocating the second movable holder 534b is located at the left side in the drawing, that is, toward the movable optical fiber 523 from the second movable holder 534b. The electromagnetic actuator 550a (550b) included in the optical switch mechanism 540a (540b) has an E-shaped yoke 552a (552b). End legs 556a and 556a' (556b and 556b') provided on either ends of the back yoke 554a (554b) of the E-shaped yoke extend from the back yoke 554a (554b) to the vicinities of side surfaces of the movable holder 534a (534b). A center leg 562a (562b) extending from the center of the back yoke 554a (554b) toward the movable holder 534a (534b) is provided with a permanent magnet 564a (564b) and a soft magnetic material block 566a (566b). The end legs 556a and 556a' (556b and 556b') are provided with pole pieces 558a and 558a' (558b and 558b'), respectively, the pole pieces 558a and 558a' (558b and 558b') face the respective side surfaces of the movable holder 534a (534b), and the movable holder can reciprocate between the pole pieces. Coil members 572a and 572a' (572b and 572b') are wound around the end legs 556a and 556a' (556b and 556b'), respectively. As described so far, the optical switch shown in FIG. 5 has substantially the same structure as that of the optical switch shown in FIG. 1, with the exception that two electromagnetic actuators shown in FIG. 1 are used.

As apparently seen from the comparison between the optical switch 500 shown in FIG. 5 and the optical switch 700 shown in FIG. 7, since the electromagnetic actuators 550a and 550b are disposed so as to overlap the area where the movable optical fibers 523 is deformed in the optical switch shown in FIG. 5, there is no need to allow a length accommodating the electromagnetic actuator portion in the optical switch. Therefore, the length of the optical switch can be reduced. While the length of the optical switch shown in FIG. 7 is 52.6 mm, the length of the optical switch shown in FIG. 5 is 46.6 mm.

What is claimed is:

1. An optical switch for connecting and/or disconnecting an optical path, comprising:

a housing;

at least one fixed optical fiber having an open end in the housing;

at least one movable optical fiber having an open end capable of moving relatively to the open end of the fixed optical fiber, the open end of the movable optical fiber being located in the housing;

a fulcrum fixing the movable optical fiber at a distance from the open end of the movable optical fiber;

a movable holder of magnetic material holding the movable optical fiber adjacent to the open end of the movable optical fiber and allowing the movable optical fiber to resiliently pivot on the fulcrum to move the open end of the movable optical fiber relatively to the open end of the fixed optical fiber; and an electromagnetic actuator reciprocating the movable holder, the electromagnetic actuator being located in an area on the movable optical fiber side from the open end of the movable optical fiber in the housing, wherein the electromagnetic actuator comprises:

a first yoke having a first pole piece;

a second yoke having a second pole piece, the movable holder being placed between the first and second pole pieces so as to reciprocate between the two pole pieces;

a permanent magnet exerting a magnetic flux on the first and second yokes and the movable holder, the permanent magnet constituting a first magnetic path along with the first yoke and the movable holder and constituting a second magnetic path along with the second yoke and the movable holder;

a first coil member wound around the first yoke to adjust the magnetic flux between the movable holder and the first pole piece; and a second coil member wound around the second yoke to adjust the magnetic flux between the movable holder and the second pole piece.

2. An optical switch as set forth in claim 1, wherein the electromagnetic actuator comprises an E-shaped yoke having two end legs and a center leg, the end legs constituting the first and second yokes, respectively, and the center leg having the permanent magnet.

3. An optical switch as set forth in claim 2, wherein the E-shaped yoke has a back yoke connecting the center leg to both the end legs.

4. An optical switch as set forth in claim 3, wherein the back yoke includes the fulcrum.

5. An optical switch as set forth in claim 3, wherein the first and second coil member extend from the vicinities of the first and second pole pieces, respectively, to the vicinity of the back yoke.

6. An optical switch as set forth in claim 2, wherein the permanent magnet is located at the end of the center leg to face the movable holder.

7. An optical switch as set forth in claim 1, wherein the electromagnetic actuator further comprises a back yoke magnetically connecting the permanent magnet to both the first and second yokes.

8. An optical switch as set forth in claim 7, wherein the back yoke includes the fulcrum.

9. An optical switch as set forth in claim 7, wherein the first and second coil member extend from the vicinities of the first and second pole pieces, respectively, to the vicinity of the back yoke.

10. An optical switch for connecting and/or disconnecting an optical path, comprising:

a housing having at least two end walls facing each other;

at least one fixed optical fiber having an open end adjacent to one of the end walls in the housing;

at least one movable optical fiber having an open end capable of moving relatively to the open end of the fixed optical fiber, the open end of the movable optical fiber being located in the housing;

a fulcrum fixing the movable optical fiber at a distance from the open end of the movable optical fiber and located near the other end wall in the housing;

a movable holder of magnetic material holding the movable optical fiber adjacent to the open end of the movable optical fiber and allowing the movable optical fiber to resiliently pivot on the fulcrum to move the open end of the movable optical fiber relatively to the open end of the fixed optical fiber; and an electromagnetic actuator reciprocating the movable holder, the electromagnetic actuator being located in an area on the movable optical fiber side from the open end of the movable optical fiber in the housing, wherein the electromagnetic actuator comprises a first yoke having a first pole piece;

a second yoke having a second pole piece, the movable holder being placed between the first and second pole pieces so as to reciprocate between the two pole pieces;

a permanent magnet exerting a magnetic flux on the first and second yokes and the movable holder, the permanent magnet constituting a first magnetic path along with the first yoke and the movable holder and constituting a second magnetic path along with the second yoke and the movable holder;

a first coil member wound around the first yoke to adjust the magnetic flux between the movable holder and the first pole piece; and a second coil member wound around the second yoke to adjust the magnetic flux between the movable holder and the second pole piece.

* * * * *